United States Patent Office 3,162,690
Patented Dec. 22, 1964

3,162,690
METHOD OF PURIFYING CRUDE p,p'-ISO-PROPYLIDENE DIPHENOL
Alfred Marx, Hans Wille, Ludwig Rappen, and Hans Gautzsch, all of Duisburg-Meiderich, Germany, assignors to Gesellschaft fuer Teerverwertung m.b.H., Duisburg-Meiderich, Germany, a corporation of Germany
No Drawing. Filed Dec. 28, 1960, Ser. No. 78,863
Claims priority, application Germany, Dec. 29, 1959, G 28,709
13 Claims. (Cl. 260—619)

The present invention relates to a method of purifying crude p,p'-isopropylidene diphenol, and more particularly to a method of recovering p,p'-isopropylidene diphenol of very high purity and having a very high melting point from a crude product obtained by the condensation of phenol and acetone.

p,p'-isopropylidene diphenol, also designated as 2,2'-bis-(4-hydroxy phenyl)propane or p,p'-dihydroxy diphenyl dimethyl methane, is commonly referred to by the trade name "Bisphenol A" and this term will be employed hereinafter interchangeably with the chemical name for the sake of brevity. Bisphenol A is an important starting material for the production of epoxy resins and polycarbonates. Particularly for the manufacture of polycarbonates a Bisphenol A of high purity is required. It should be colorless and its melting point should not be lower than 155° C.

It is common practice to synthesize Bisphenol A by condensation of acetone with phenol in the presence of acid condensing agents, such as hydrochloric acid or sulfuric acid. Sulfur compounds, such as mercaptans and aliphatic thiocarboxylic acids, are employed as catalysts. The reaction required the presence of an excess of phenol.

The reaction mixture obtained is usually referred to as "crude Bisphenol," but it is actually an addition compound of Bisphenol and phenol. The phenol is bound to the Bisphenol in such a manner that it cannot be successfully extracted by solvents in which phenol as such is readily soluble, such as water. Even at elevated temperatures of 50° C. to 60° C. phenol is removed from the crude product only very slowly and not completely. The washed crude product thus is not suitable for most applications of Bisphenol and further purification is necessary.

It has previously been proposed to recrystallize the crude product from organic solvents or to dissolve it in alkali metal hydroxide solution and to precipitate a purified compound therefrom by the introduction of carbon dioxide. These methods are relatively costly and their yield is unsatisfactory.

A product of greater purity is available by distillation of the crude material. Bisphenol, however, when distilled from the crude mixture tends to decompose, and decomposition cannot entirely be avoided by distillation in a vacuum. The condensate is usually discolored and its melting point is lower than would be desirable.

Purification by distillation is also predicated on previous removal of residual acid which would interfere even with vacuum distillation. It is known to remove acid prior to distillation by dispersing the crude product in hot water containing bases acting as neutralizing agents, and to recover the organic material by chilling with cold water which causes it to precipitate in granules. However, these known methods of purification of crude Bisphenol A by vacuum distillation yield a commercial product which has a yellowish tinge and a melting point which is barely above 152° C.

The principal object of the present invention is to provide a relatively simple and inexpensive method of recovering pure Bisphenol A from the crude Bisphenol product.

Another object of the present invention is the recovery of a Bisphenol A which has a melting point above 155° C. and is colorless.

A further object of the present invention is the recovery of pure Bisphenol A from the crude product in high yields.

With these and other objects in view, the present invention consists mainly in heating the crude product, in the form in which it is obtained in its synthesis, in the presence of cresol, more specifically m-cresol, p-cresol, or their mixtures rich in m- and p-cresol, until a substantially liquid mixture is obtained. The cresol should be present in amounts in excess of the molar equivalent of the Bisphenol A in the crude product. The crude Bisphenol A is dissolved in said cresol on heating. Upon cooling the resulting solution, a cresol addition compound of Bisphenol A precipitates from the mixture. It is separated from the remainder of the mixture and can be split into its components by heating. Bisphenol A can be distilled in a vaccum from its addition product with cresol without decomposition.

The cresol addition compound resulting from the dissolution of the crude Bisphenol A product in cresol contains only p-cresol and m-cresol even if a crude technical cresol mixture containing also o-cresol is employed. The new purification process according to the present invention thus is based on the fact that the phenol bound to Bisphenol A in the crude product is displaced by m-cresol and p-cresol to form the new addition compound which consists of substantially equimolecular amounts of Bisphenol A and such cresols. The m- and p-cresols are interchangeable. The cresol addition compound can be separated from the liquid phase which contains the phenol, for instance, by centrifuging.

When the Bisphenol A-cresol addition compound is distilled in a vacuum, cresol is obtained as a first fraction, and very pure colorless Bisphenol A as a higher boiling fraction.

All by-products of the condensation reaction between acetone and phenol, such as polycyclic compounds, acid fractions, and the like, remain in the mother liquor together with the phenol as only Bisphenol A is capable of forming an addition compound that is precipitated under the prevailing conditions which is thus effectively separated from the accompanying impurities.

Adhering small amounts of mother liquor are preferably removed from the precipitated Bisphenol A-cresol addition compound by washing with solvents such as hydrocarbons and halogenated hydrocarbons. Carbon tetrachloride is preferred.

Water also is effective in removing adhering mother liquor from the precipitated addition compound, particularly when it contains cresol. Water saturated with cresol has been found to be most economical and to selectively remove impurities. It is preferably employed at temperatures somewhat above room temperature, for example, at 30° C. to 50° C.

The amount of cresol present must exceed that required for formation of the addition compound with Bisphenol A, and relatively large amounts are necessary to achieve solution of the crude Bisphenol product. When a technical cresol mixture is employed as the solvent, it is preferably employed in amounts of 100% to 200%, by weight, of the crude Bisphenol product so that the slurry obtained after dissolution and cooling is still capable of being stirred. After cooling, part of the Bisphenol A remains in solution and its amount is substantially proportional to the excess of cresol used. It can be recovered by concentrating the mother liquor whereby cresol is distilled off and by again dissolving the Bisphenol A residue in cresol at elevated temperature. Upon cooling, additional Bisphenol A-cresol addition compound is precipitated.

The addition compound is also formed from the crude Bisphenol product and cresol in the presence of a liquid diluent such as hydrocarbons and halogenated hydrocarbons. The liquid diluent reduces the viscosity of the slurry obtained after precipitation of the addition compound and increases the purity of the compound.

Water also is beneficial when present in the mixture of crude Bisphenol product and cresol. It has been found that the excess of cresol required is smaller in the presence of water, and that it is possible to replace up to about 50% of the cresol mixture by water. The crude Bisphenol is heated with water and cresol to approximately 90° C. while stirring vigorously. Stirring is continued while the mixture is permitted to cool. The addition compound precipitates in needle-shaped crystals which are then separated from the mother liquor, for instance by centrifuging, and preferably washed with cresol-saturated water at 30° C. to 50° C.

The presence of water during the replacement reaction according to the present invention substantially reduces the amount of cresol required. The excess of cresol over the molar equivalent of the Bisphenol A present need not exceed about 50%. The addition of water thus results in a saving of at least 50% of the cresol mixture. There is also a reduction in the quantity of mother liquor that has to be worked up to improve the yield. Bisphenol A and its cresol addition compound are virtually insoluble in water and thus the primary yield of Bisphenol A is improved.

The residual amounts of Bisphenol A dissolved in the cresol excess may be recovered as described above, that is, by removal of most of the cresol by distillation whereupon the residue is again treated with hot cresol and the Bisphenol-cresol addition compound is permitted to precipitate on cooling.

The following examples are further illustrative of the present invention, and it will be understood that the invention is not limited thereto.

*Example 1*

1,400 g. of crude Bisphenol A product obtained by condensation of acetone with phenol and consisting of approximately 72% of Bisphenol A and 28% of phenol with minor amounts of other impurities are dissolved in technical grade cresol consisting of 71% of m- and p-cresol, 11% of o-cresol, and 18% of other phenol homologues, mainly dimethyl phenols, at 90° C. with vigorous agitation. After complete dissolution, the mixture is cooled to 20° C. and its solid constituents are separated from the mother liquor in a centrifugal separator.

1,238 g. of Bisphenol-cresol addition compound are obtained as recovered solids and are distilled at 10 mm. Hg. 435 g. of cresol and 800 g. of colorless Bisphenol A are obtained as separate fractions. The Bisphenol A has a melting point of 154.5–156.5° C. The yield is 79.4% of the total Bisphenol A present in the crude starting material. The addition compound, which has not been washed, still retains approximately 4% by weight of the mother liquor, which cannot be entirely removed by centrifuging.

The separated mother liquor contains additional amounts of Bisphenol A of which 85 g. are recovered in the afore-described manner, bringing the total yield to 87.8%.

*Example 2*

A Bisphenol-cresol addition compound precipitated and separated from the mother liquor by following the procedure of Example 1 is washed in the centrifugal separator with 200 cc. of carbon tetrachloride at 15° C. 1,190 g. of washed addition compound are removed from the separator and are distilled in a vacuum of 15 mm. Hg. A cresol fraction of 390 g. and 795 g. of pure Bisphenol A are obtained. The yield is 78.9%. The amount recovered from the mother liquor increases the yield by 9.1% to a total yield of 88%. The resulting Bisphenol A is colorless and has a melting point of 156–157.3° C.

*Example 3*

A Bisphenol addition compound separated from the mother liquor as described in Example 1 is washed in the centrifugal separator with 500 cc. of water containing 2% of the technical cresol mixture described and used in Example 1. The aqueous washing liquid has a temperature of 40° C. The addition compound and the mother liquor are worked up as described in the preceding examples and a total of 875 g. of colorless Bisphenol A of a melting point of 155.8–157.1° C. is obtained. The yield is 86.8%.

*Example 4*

1,400 g. of the crude Bisphenol product of Example 1 are heated in a mixture of 1,000 cc. of carbon tetrachloride with 2,000 g. of a technical cresol mixture of the composition given in Example 1 to the boiling point of the solvent mixture. The mixture is kept at said temperature for 5 minutes under agitation. A minor portion of solid material remains undissolved. The mixture is cooled to 10° C. and is centrifuged at said temperature. The solid cake is washed at 10° C. with 200 cc. of carbon tetrachloride. Vacuum distillation of the washed addition compound yields 845 g. of colorless Bisphenol A, having a melting point of 156.5–157.5° C. The yield is 83.8% in the single operation step described.

*Example 5*

1,600 g. of the crude Bisphenol A product described in Example 1 are mixed with 1,000 cc. of water and 1,000 g. of the technical grade cresol mixture described in the preceding examples. The excess of m- and p-cresol over the Bisphenol A content of the crude product is 30%. The mixture is heated to 90° C. with vigorous stirring and a homogeneous liquid is formed. The temperature of said liquid is maintained at 90° C. for a short period of time and the liquid is then cooled to 10° C. The addition compound crystallizes in the form of well-defined crystalline needles. It is separated from the mother liquor by centrifuging and is washed at 40° C. with 500 cc. of water saturated with the cresol mixture. The washed addition compound is decomposed by vacuum distillation and 992 g. of colorless Bisphenol A having the melting point of 156.2–157.3° C. are recovered. The yield obtained in the above described single step operation amounts to 86.1%.

While the examples given hereinabove describe the preferred use of crude mixtures containing m- and p-cresol, it is also possible to employ, in place of such mixtures, substantially pure m-cresol or pure p-cresol. Thereby, the substantially pure addition compounds of Bisphenol A-m-cresol or, respectively, Bisphenol A-p-cresol are obtained which can readily be separated from the excess of m-cresol or, respectively, p-cresol used in the preparation of said addition compounds according to the present invention.

In place of carbon tetrachloride used in the production of the 4,4'-isopropylidene diphenol-cresol addition compound as well as in washing the precipitated addition compound, as used in the preceding examples, there may be employed other hydrocarbons such as benzene or gasoline or other halogenated hydrocarbons such as trichloroethylene while otherwise the procedure is followed as described in said examples.

The needle-shaped crystalline addition compound of 4,4'-isopropylidene diphenol and the mixture of m- and p-cresol as obtained, for instance, according to Example 5, has a melting point of 90° C. while the substantially pure addition compound with m-cresol has a melting point of 90° C. and that with p-cresol has a melting point of 110 °C.

While the invention has been described with particular reference to specific embodiments, it is to be understood that it is not limited thereto, but is to be construed broadly and restricted solely by the scope of the appended claims.

We claim:

1. In a method of purifying crude p,p'-isopropylidene diphenol, the steps which comprise heating said crude product in the presence of a cresol selected from the group consisting of m-cresol, p-cresol, and mixtures containing same, said cresol being present in an amount in excess of the molar equivalent of said p,p'-isopropylidene diphenol until a substantially liquid mixture is obtained; cooling said mixture until the cresol addition compound of p,p'-isopropylidene diphenol precipitates from said mixture, separating the precipitated addition compound from the remainder of said mixture, and heating and subjecting said addition product to fractional distillation in a vacuum so as to split up and to separate substantially pure p,p'-isopropylidene diphenol from said cresol.

2. The method as set forth in claim 1, wherein said cresol is a technical grade cresol.

3. The method as set forth in claim 1, wherein the crude p,p'-isopropylidene diphenol is heated in the presence of said cresol and in the further presence of water.

4. The method as set forth in claim 1, wherein said cresol is present in an amount not exceeding a molar ratio of cresol to p,p'-isopropylidene diphenol of 1.5:1.0.

5. The method as set forth in claim 1, wherein the crude p,p'-isopropylidene diphenol is heated in the presence of said cresol and in the further presence of an amount of water approximately equal, by weight, to the amount of said cresol.

6. The method as set forth in claim 1, wherein the crude p,p'-isopropylidene diphenol is heated with said cresol in the presence of a liquid diluent selected from the group consisting of hydrocarbons and halogenated hydrocarbons.

7. The method as set forth in claim 6, wherein said liquid diluent is carbon tetrachloride.

8. The method as set forth in claim 1, wherein the precipitated addition compound, after separation from the mother liquor, prior to heating is washed with a solvent in which the mother liquor is soluble so as to remove mother liquor adhering to the precipitate.

9. The method as set forth in claim 8, wherein said solvent is water.

10. The method as set forth in claim 8, wherein said solvent is water saturated with cresol.

11. The method as set forth in claim 8, wherein the precipitated addition compound is washed with water saturated with cresol at a temperature substantially between 30° C. and 50° C.

12. The method as set forth in claim 8, wherein said solvent is a halogenated hydrocarbon solvent.

13. The method as set forth in claim 12, wherein said halogenated hydrocarbon solvent is carbon tetrachloride.

References Cited in the file of this patent
UNITED STATES PATENTS

| | | |
|---|---|---|
| 2,669,588 | Deming et al. | Feb. 16, 1954 |
| 2,791,616 | Luten | May 7, 1957 |